Feb. 17, 1931.                J. J. NAUGLE                1,793,289
                           FILTERING APPARATUS
                          Filed Jan. 12, 1924      4 Sheets-Sheet 1

Feb. 17, 1931.  J. J. NAUGLE  1,793,289
FILTERING APPARATUS
Filed Jan. 12, 1924  4 Sheets-Sheet 3

John J. Naugle Inventor
By his Attorney
Edward M. Evarts

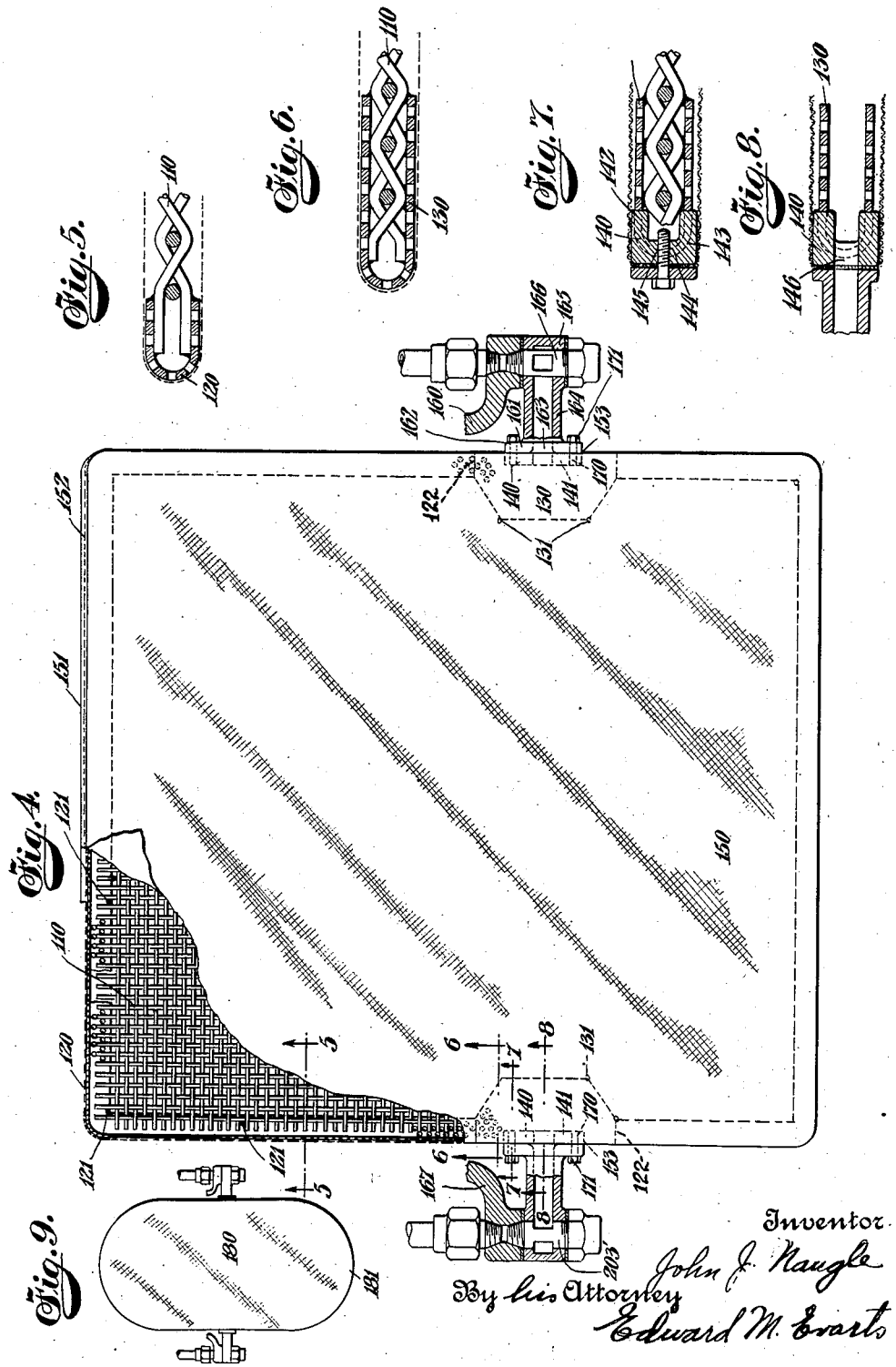

Patented Feb. 17, 1931

1,793,289

UNITED STATES PATENT OFFICE

JOHN J. NAUGLE, OF BROOKLYN, NEW YORK

FILTERING APPARATUS

Application filed January 12, 1924. Serial No. 685,820.

My present invention relates to filtering machines and the like, and particularly, but not exclusively, filtering machines of the rotary type, and aims to devise devices of the general character designated above, which, while being comparatively simple in construction, and thus easy, safe and convenient to assemble and to operate, shall at the same time render possible a very high rate and efficiency of filtration; shall render possible the convenient determination and control of the discharge of filtrate from the various filtering elements and from the machine as a whole; shall enable the ready and convenient determination of which one of the series of filtering elements is defective, and the ready disconnection and replacement of such a defective filtering element; shall enable the speedy, convenient and thorough cleansing of the machine after a cycle of filtering operation; and which shall provide other novel and highly important features of construction and operation more fully pointed out hereinafter.

In the accompanying specification I shall describe, and in the annexed drawing show, an illustrative embodiment of the machine of the present invention. It is, however, to be clearly understood that my invention is not limited to the specific embodiment thereof herein shown and described for purposes of illustration only.

Referring to the drawings, wherein I have shown the aforesaid illustrative embodiment of the present invention:

Fig. 4 is a plan view of one of the filtering elements;

Fig. 5 is a cross sectional view taken along line 5—5 of Fig. 4;

Fig. 6 is a cross sectional view taken along line 6—6 of Fig. 4;

Fig. 7 is a cross sectional view taken along line 7—7 of Fig. 4;

Fig. 8 is a cross sectional view taken along line 8—8 of Fig. 4; and

Fig. 9 is a plan view of a modified form of filtering element.

Figure 1:
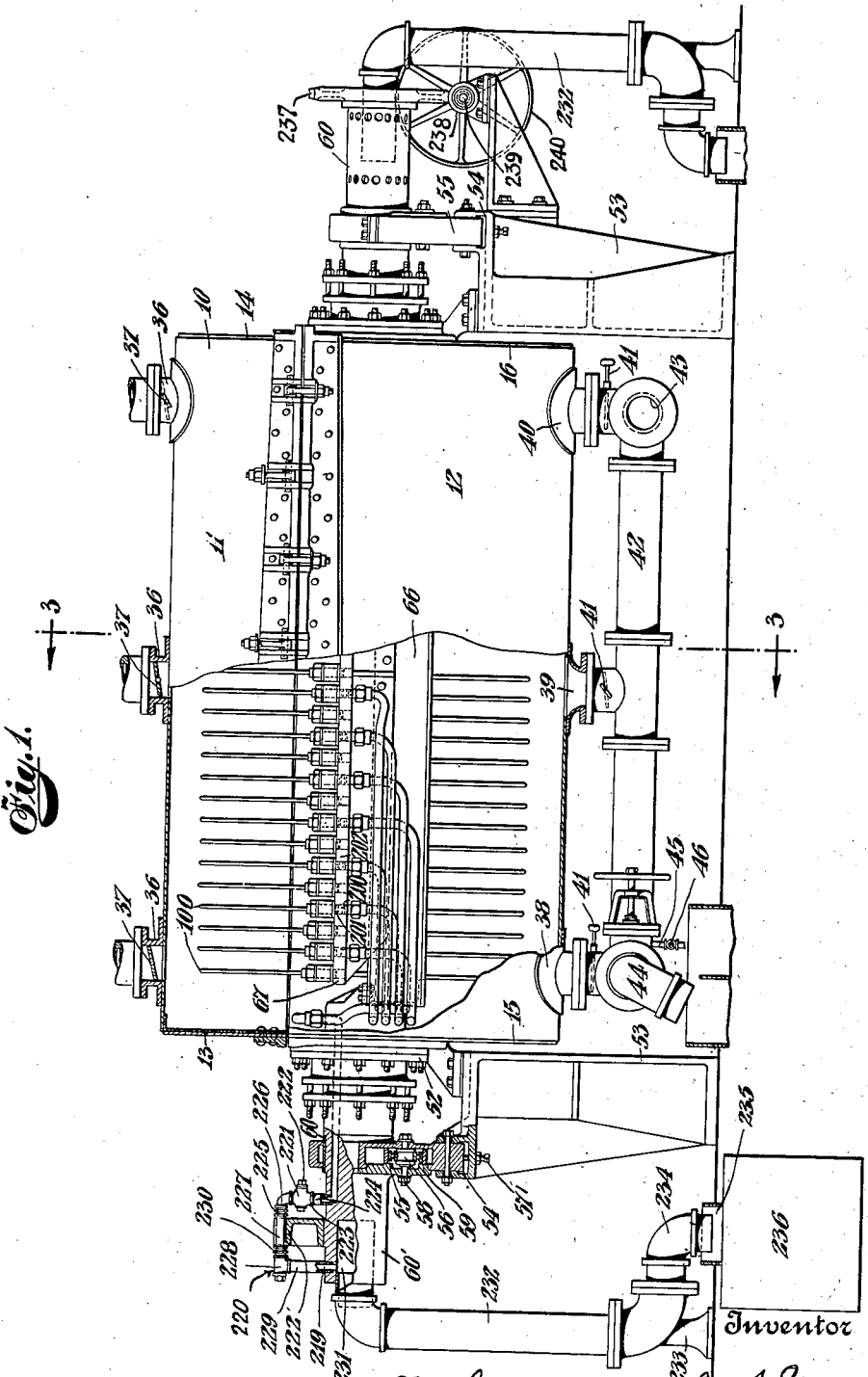
Fig. 1 is a longitudinal sectional view, partly in elevation and partly broken away, of the machine as a whole.

Referring now more particularly to the aforesaid illustrative embodiment of the present invention, the same will be described, for purposes of convenience and example, as applied to the filtration and purification of sugar solutions, particularly by the use of a filtering agent, such as an activated carbon, such as the carbon known to the trade as "Suchar". Referring to the drawings, 10 comprises the shell or main receptacle or container of the filtering machine. The shell 10 preferably consists of a plurality of cooperating, separable sections 11 and 12. Preferably the sections 11 and 12 are provided with associated end portions, the section 11 being provided with the end portions 13 and 14, and the section 12 being provided with the end portions 15 and 16.

The shell sections 11 and 12 are preferably of unequal cross-sectional area. In the example shown, the upper shell section 11 is of smaller cross-sectional area than the lower shell section 12. For example, where the shell 10 is of substantially cylindrical conformation, the upper shell section will be less than a semi-cylinder and the lower shell section more than a semi-cylinder in volume and corresponding area and cross-section.

The associated shell sections 11 and 12 are arranged so as to be hinged together by any suitable means. Preferably, I employ a series of adjustable hinges, more clearly shown in Figure 3 of the drawing, and comprising the lower hinge supporting members 17 providing the pivot-supporting plates or posts 18 and suitably attached to the lower shell section 12 by any suitable means, such as the rivets shown in the drawing. Cooperating with each lower hinge member 17 is the upper hinge member 19 riveted or otherwise suitably fastened to the upper shell section 11 as shown in the drawing. The upper hinge portion 19 has the adjustable pin post 20, fitting between the pivot-supporting plates or posts 18 for receiving the pivot pin 21 which forms the pivot or hinge joint for each of the adjustable hinges. The adjustment of the hinge may be effected by means of the nut 22 cooperating with the upper threaded end 23 of the pin or equivalent member 20. Any desired number of adjustable hinges may be employed, approximately eight such hinges being used in the device illustrated in the drawings.

One of the shell sections, preferably the upper shell section 11, is provided with a gasket-receiving groove or grooves 24 along its edge or edges, there being preferably provided a contiguous groove 24 along the four bottom edges of the upper shell section 11. Fitting into the groove 24 is a gasket or series of gaskets 25, preferably in strip form. The gasket 25 has a lower bevelled edge 26 providing a depending hydraulic lip 27, more clearly shown in Figure 3 of the drawing. The upper edge of the remaining shell section, comprising the lower shell section 12, is preferably bevelled, as indicated at 27', for cooperating with the lower bevelled edge and depending hydraulic lip 26 and 27, respectively, of the gasket 25. The importance of this construction and the mode of its utilization will be made clear hereinafter.

In order to seal the shell 10 by the watertight contact of the shell sections 11 and 12, I provide a plurality of adjustable swing bolts comprising the upper bolt members 28, provided with the bolt-receiving plates or posts 29 and the pin 30 about which swings the bolt 31. The bolt members 28 may be fastened to the upper shell section 11 by any suitable means, such as the rivets shown in the drawing. Cooperating with each upper bolt member 28 is the lower bolt member 32 providing the bolt-receiving plates or members 33. A nut 34 is provided on the lower threaded end 35 of each bolt 31, thus enabling the bolts to be swung into place and the shell sections 11 and 12 brought into water-tight contact with each other by tightening the nuts 34, thus compressing the gasket or gaskets 25 and forcing inwardly the depending hydraulic lip or lips 27. Any increase in pressure of the fluid within the shell 10 during the filtering or cleansing operations, or both, due to the provision of the bevelled edge 27' of the lower shell section 10 and the shape of the gasket or gaskets 25, serves only all the more tightly to wedge in and seat firmly in place the gasket or gaskets 25. In this way the increase in pressure of the fluid within the shell 10 serves only all the more effectively to seal the shell against the escape of fluid.

Leading from the shell 10, preferably by communicating with the upper shell section 11, are one or more, herein shown as three, outlets or bleeds 36 for permitting the circulation of unfiltered liquor containing in suspension therein the filtering agent, such as the "Suchar" or other activated carbon already referred to. Each of the bleeds 36 is preferably provided with a valve 37 enabling the circulation of unfiltered liquor carrying the filtering agent in suspension to be controlled or even entirely shut off, as desired. The purpose of this is to increase the efficiency of the filtering agent.

Likewise communicating with the interior of the shell 10, preferably by communicating with the lower shell section 12, are one or more, here shown as three, inlets for liquid to be filtered generally designated by reference characters 38, 39 and 40. Each filtrate inlet is provided with its appropriate valve, generally designated by reference character 41. The three inlets 38, 39 and 40, communicate, by way of their respective valves 41, with the conduit 42, which in turn leads to the filter feed pipe 43 through which filter or cleansing liquors, at will, may be admitted to the machine by the use of proper valve-controlled conduits communicating with the tanks for filter or cleansing liquors, as the case may be, which conduits and reservoir are not here deemed necessary to be shown. A swing pipe 44 is preferably provided for communicating, by way of the valves 41 and the inlets 38, 39 and 40, with the interior of the shell 10. By its manipulation and by the manipulation of the valves 41 it may serve to return the exhausted or partly used filtering agent, such as the "Suchar" or other vegetable carbon, back to the system, or to the revivifier, or it may be used to send the excess liquor back to the "blow-off" or reservoir for filtering liquors.

Communicating with the interior of the shell 10, preferably by passing into and through the inlets 38, 39 and 40, are one or more steam inlets for admitting steam to the interior, preferably the lower portion, of the shell 10. The steam inlet pipes, designated by reference characters 45, are preferably controlled by valves 46, as shown more clearly in Figure 1 of the drawing. These steam inlet pipes are used principally for cleansing purposes, as will be more fully pointed out hereinafter.

For the same purpose, I provide a series of cleansing or sluicing nozzles 47 which are mounted for orientation in a manifold or pipe 48 communicating with any suitable source of supply of cleansing fluid, such as hot water, which supply is not deemed necessary to be shown here. For this purpose each nozzle 47 may be provided with a ball and socket or universal joint in the pipe 48, as designated by reference character 49 and shown more clearly in Figure 3 of the drawing. Means are provided for orienting the nozzles 47. For example, I may provide the nozzle-supporting plates 50 with a nozzle-orienting rod 51 attached to all of the nozzle-supporting plates 50, of which there are as many as there are nozzles. Accordingly, by the manipulation of the orienting rod 51, the nozzles 47 may be oriented as desired.

Figure 2:
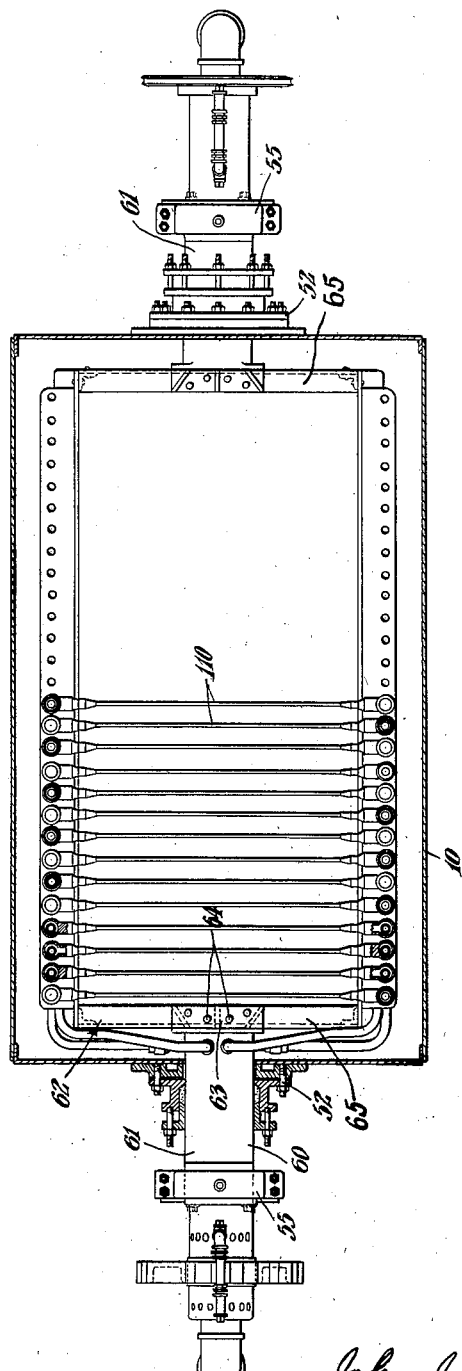
Fig. 2 is a horizontal sectional view, partly in elevation and partly broken away, of the machine as a whole.

Mounted on the shell 10, preferably on the shell section of greater cross-sectional area, as on the ends 15 and 16 of the lower shell section 12 of more than semi-cylindrical volume and corresponding area, are a plurality of non-split circular glands 52, more clearly shown in Figures 1 and 2 of the drawing. By means of these non-slit circular glands 52, the bearings for the rotary parts of the machine and for the shell 10 itself may be rendered water-tight in a very ready and convenient manner and the assembly of the entire machine rendered very speedy, accurate and convenient.

For supporting the shell 10 and the associated parts of the machine, I provide a plurality of standards 53 which, in the grooves 54, carry the bearings 55. Preferably the bearings 55 are roller bearings which are preferably also of a non-split construction and are preferably adjustable in the manner and for the reasons now to be described. Each bearing 55 is provided with a pair of roller bearings 56 and with the central opening 57 through which the respective ends of the shaft subsequently described herein pass. By means of an adjusting screw 57', the position of each bearing 55 may readily be adjusted to receive the respective ends of the shaft in proper position. By the arrangement shown, it will be noted that the glands 52 do not bear any appreciable portion of the weight of the machine, such weight being borne almost entirely by the rollers of the bearings 55. The rollers 56 are rotatably carried on the pins 58 within the shell or housing 59 of the bearings as a whole, in the manner well known to those skilled in the art to which the present invention relates.

Cooperating with the glands 52 and the bearings 55, and intended for carrying the rotatable parts of the machine, is a shaft generally indicated by reference character 60 and preferably consisting of a plurality of separate shaft sections 61. The shaft sections 61 are preferably comparatively short so as to be capable of insertion through the ends of the shell and into and through the glands 52 and the bearings 55 from within the shell itself. This construction is of great importance as enabling the very ready, quick and convenient assembly and disassembly of the machine and of the various parts thereof within the shell of the machine.

Carried for rotation within the shell 10, preferably by being attached to the inner ends of the shaft sections 61, is a filter-element supporting frame generally designated by reference character 62. For this purpose, the inner ends of the shaft sections 61 are preferably provided with the flanges 63, each shaft section 61 being provided with one such flange 63. To the flanges 63, as by means of the bolts or rivets 64, shown more clearly in Figure 2 of the drawing, are attached the transverse members of the frame 62 which is preferably of substantially rectangular configuration. The transverse members 65 of the frame 62 preferably comprise channel beams to which are attached the longitudinal members 66 of the filter-element supporting frame 62. The longitudinal members 66 are preferably in the form of angle irons which are attached to the transverse members or channel beams 65 of the frame 62. Attached to the transverse members 66 are longitudinal connection members or manifolds through which connections pass between the various filter elements and the discharge passages for filtrate from such elements. The manifolds have been generally indicated by reference character 67 and are more clearly shown in Figures 1 and 3 of the drawings.

Carried by the filter-element supporting frame 62 are one or more, preferably a plurality, here shown as twenty-eight, filtering elements, each of which has been generally designated by reference character 100. The filtering elements themselves are not a part of the present invention, being more fully described and claimed in one of my copending applications entitled "Filtering elements", filed of even date herewith and bearing Serial No. 685,822. However, for the purpose of completing the description and for the reason that certain features of the filtering elements combine very effectively with the remaining features of the machine to produce certain new and very important results, I shall describe the construction of the filtering element in some detail. Referring to any one of the filtering elements 100, particularly as shown in Figures 4, 5, 6, 7 and 8 of the drawing, 110 indicates a foraminous member, preferably made of metal, such as a metal screen. Since the member 110 does not constitute the filtering surface proper, but merely a support for the same, it should preferably be quite coarse, as by having the meshes of the screen warped to a considerable extent, so as to provide proper open spacing for the filtering member itself.

Associated with the metal screen 110 is a peripheral binding member 120. The binding member 120 is preferably made of metal and is preferably U-shaped in cross section, as shown more clearly in Figure 5 of the drawing. In order to provide a maximum filtering surface for the filtering element of the present invention, and also so that the filtering element may readily be cleansed by flowing cleansing water or other liquor through the element in a reverse direction to the direction in which the filtrate flows through such element, I prefer that the material of the binding member 120 shall be foraminous or pervious, as by being made of perforated metal, as shown more clearly in Figures 4 and 5 of the drawing.

By making the peripheral binding member 120 of perforated or other foraminous metal or other material, that part of the filtering element proper in contact with the peripheral binding member 120 can act efficiently as a filtering surface, and, conversely, when the filtering element as a whole is being cleansed, after a cycle of the filtering operation, by the flow of water or other cleansing liquor in the reverse direction through the filtering element, the element will be cleansed not only along its central portions but even at its periphery. The advantages of this arrangement, both in the efficiency of the filtering element per square foot of total surface and in the ease and thoroughness with which the element can be cleansed after use will be at once apparent. The peripheral binding member 120 may be readily attached to the screen 110 by any suitable metal-joining means, as by spot welding at the spots indicated by reference character 121 in Figure 4 of the drawing.

Cooperating with the screen 110 and with the peripheral binding member 120 is a reinforcing fitting member, generally indicated by reference character 130. The reinforcing fitting member 130, more clearly shown in Figures 4 and 6 of the drawing, is preferably of U-shaped cross section, like the peripheral binding member 120, and also, like the latter member, is preferably made of perforated metal, for the reasons already suggested above. Preferably, the peripheral binding member 120 is cut away, as indicated by reference character 122, to accommodate the reinforcing fitting members 130. The latter are now suitably rigidly attached to the screen 110 and to the peripheral binding member 120 by any suitable metal-joining process, as by spot welding at the points 131 indicated in Fig. 4 of the drawing.

Cooperating with the screen 110 and with each reinforcing fitting member 130, there being preferably two such reinforcing fitting members, is a flanged fitting member 140, more clearly shown in Figures 4, 7 and 8 of the drawing. For this purpose the reinforcing fitting members 130 are preferably cut away, as indicated by reference character 141, to accommodate the flanged fitting members 140, the latter having the flanged portions 142 and 143 and the transverse web portion 144. The web portions 144 are provided with the threaded openings at 145, of which two are preferably provided, to accommodate the assembly bolts subsequently described, and are also provided with the central discharge openings 146. The flanged fitting members 140 are preferably rigidly connected to the screen and to the associated reinforcing fitting members 130 by brazing or any other suitable metal-joining process.

Passing over the screen 110, the peripheral binding member 120, the reinforcing fitting members 130 and the associated flanged fitting members 140, is the filtering member proper, generally indicated by reference character 150, and preferably consisting of a cotton cloth bag of the desired strength and fineness or coarseness of texture, depending upon the nature of the particular liquid being filtered and the desired completeness or roughness of the filtering operation. The bag 150 is preferably initially closed on three sides, the fourth side, indicated by reference character 151, being left open so as to enable the bag to receive the metal screen 110 and the associated metal parts. After the metal screen 110 and the associated metal parts have been passed into the bag 150 through the open end 151, the material of the bag at the open end is folded over and sewed firmly into place by a coarse thread forming the seam 152. The portion 153 of the bag 150, overlying each of the flanged fitting members 140, is roughly perforated adjacent the threaded openings 145, intended to accommodate the assembly bolts, and adjacent the discharge opening 146. These portions 153 of the bag 150 serve as gaskets between the respective flanged fitting members 140 and the fittings now to be described.

Each filtering element 100 is provided with one or more fittings, here shown as two fittings, generally designated by reference characters 160 and 167. While both or all of the fitting members may communicate with the interior of the respective filtering elements for the discharge of filtrate therefrom, or for the admission of cleansing fluid thereto, I prefer in the present instance that only one of the fitting members, here shown as the fitting member 160, shall thus communicate with the interior of the respective filtering elements 100.

Referring now more particularly to the fitting member 160, which communicates with the interior of the filtering element 100, said fitting, which comprises the discharge passage means for filtrate passing through the filtering cloth, along the screen 110, through the perforations of the peripheral binding member 120 and the reinforcing fitting members 130, and out of the filtering element through the discharge passage 146 in the flanged fitting member 140, comprises the flanged base portion 161, provided with the apertures 162 for receiving the shanks of the bolts, and is provided also with the entrance 163 for filtrate. Forming an extension of the base plate 161 is the tubular or pipe portion 164 which leads to the transverse or tubular portion 165, the portions 164 and 165 forming a sort of T-fitting.

The tubular portion 165 is provided with the annular filtrate-receiving channel or passage 166 on the interior face thereof. The remaining fitting 167 at the opposite side of the filtering element, as already suggested, is preferably without a filtrate-receiving channel in its inner face, so that it serves merely to help to mechanically support the filtering element but without serving as a discharge passage for the filtrate. However, if desired, and as already suggested, the fitting 167 may be constructed similarly to the fitting 160, so that the filtrate may be discharged through both sides, rather than merely through one side, of each filtering element.

It may here be stated that for convenience in assembly, operation and control, one-half or any other desired fraction of the total number of filtering elements 100 preferably discharge filtrate through one end of the machine, and the remaining half or other fraction of the total number of filtering elements preferably discharge filtrate through the other end of the machine. For the same reasons, also, I prefer that the discharge and closed ends of the filtering elements, where the filtering elements discharge filtrate through one end only, shall be in staggered relation, discharge end succeeding closed end and discharge fitting succeeding closed fitting down the line of adjacent successive ends of the series of filtering elements. This arrangement is highly desirable for purposes of convenience and compactness in assembly, operation and control, and is the arrangement which has been shown in Figures 1, 2 and 3 of the drawing.

The fittings 160 and 167 of each filtering element are now attached to the corresponding filtering elements by means of the bolts 170 which pass through the openings 162 in the flanged base portion 161 of each fitting, through the rough openings in the portions 153 of the filtering cloth intended to receive the shanks of the bolts, and into the threaded openings 145 of the flanged fitting members 140 intended to receive the lower ends of the bolts 170. The bolts are provided with the heads indicated by reference character 171, thus enabling the bolts to be operated to assemble or disassemble each filtering element as a whole.

By means of the fittings 160 and 167, the filtering elements are attached to the filtering-element supporting frame 62 and partly to the manifolds 67 in the manner now to be described. Describing, for the moment, the manner of attaching a filtering element through one of the fittings 160 by means of which filtrate is discharged from the interior of each filtering element, the manifold portions 67 are provided with the pairs of upper and lower threaded communicating openings 200 and 201, respectively. These openings are slightly tapered inwardly from the upper and lower surfaces, respectively, of the transverse portion 202 of the manifold 67. A short pipe portion 203 is provided having the lower end 204, which is externally threaded and also slightly tapered to cooperate with the internal threads and slight taper of the upper opening 200 in the manifold 67.

Figure 3:
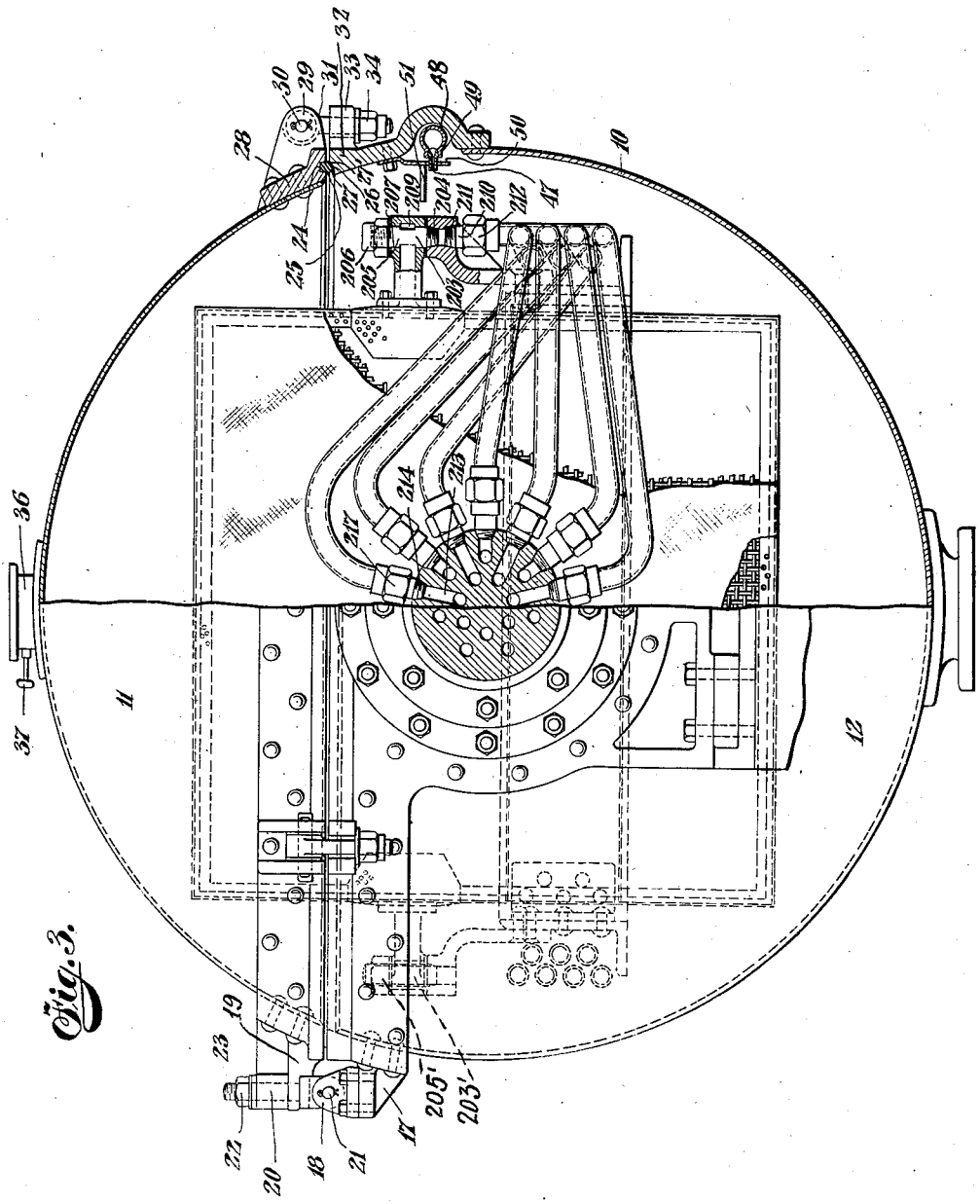
Fig. 3 is a cross sectional view, partly in elevation and partly broken away, taken along line 3—3 of Fig. 1.

The upper end 205 of the pipe portion 203 is externally threaded for cooperation with the internal threads of a cap screw 206, as shown more clearly in Fig. 3 of the drawing. Washers 207 are preferably provided to seal and render water-tight the meeting faces between the lower face of the cap screw 206 and the upper face of the transverse portion 165 of the fitting 160, and between the lower face of said transverse portion 165 of the fitting 160 and the upper face of the transverse portion 202 of the manifold 67. The central portion 208 of the short pipe portion 203 is provided with a pair of oppositely disposed openings or cut away portions 209 to receive filtrate emptying from the interior of the filtering elements into the channel 166 provided in the fitting 160.

Communicating with the lower internally threaded and slightly tapered opening 201 in the manifold 67 is a pipe 210 having the upper externally threaded and slightly tapered portion 211 for cooperation with the internally threaded and similarly tapered aperture 201 in the manifold 67. It may here be noted that there are generally as many pipes 210 as there are fittings 160. It may also be noted here that in the present machine, described by way of example merely, there being twenty-eight filtering elements 100 and one fitting 160 communicating with the interior of each filtering element 100, there will be twenty-eight pipes 210, fourteen lying on one side of the filter-element supporting frame 62, and fourteen lying on the other side of the filter-element supporting frame. Furthermore, fourteen of the pipes 210 discharge their filtrate through one end of the machine, and the remaining fourteen pipes 210 discharge their filtrate through the other end of the machine, seven pipes of each set of fourteen pipes lying on one side and the remaining seven pipes of each set lying on the other side of the filter-element supporting frame 62. This arrangement is highly convenient for the economical spacing and the proper mechanical arrangement and support of the various pipes 210 and their associated fittings. An adjustable fitting 212 may be provided in each pipe 210 for tightening the pipe in its connection with the manifold 67. The construction of the connection 212 may be such as desired and such as will be clear to those skilled in the art to which the present invention relates.

As more clearly shown in Fig. 3 of the drawing, each shaft section 61 is provided within the shell 10 with a plurality of transverse channels 213 for communicating with the outer end 214 of each pipe 210. For this purpose the outer end 215 of each transverse channel 213 is internally threaded and slightly tapered for cooperation with the correspondingly externally threaded and slightly tapered portion 216 of the outer end 214 of the pipe 210. A fitting 217 may be provided at the outer end 214 of the pipe 210 similar to the fitting 212 and for the same general purpose. It will be noted, as shown more clearly in Fig. 3 of the drawing, that the transverse channels 213 are staggered or of different lengths inwardly from the outer apertured surface of the inner portion of the shaft section 61 intermediate the flanged portion 63 of the shaft section and the inner face of each end of the shell 10. This is in order to dispose the transverse channels 213 in a manner convenient for their subsequent connection with the outer ends of pipes 210.

Each shaft section 61 is provided with means for separately and independently discharging filtrate coming from each of the filtering elements 100 and its separate and independent filtrate-discharging fitting. Preferably, such discharge means also include means for rendering visible a portion at least of the course or flow of filtrate being discharged from each filtering element. For this purpose each shaft section may be provided with a plurality, here shown as fourteen, longitudinal channels or cored passages 218, as shown more clearly in Figures 1 and 3 of the drawing. The channel or cored passages 218 each constitute one of a pair of blind channels or passages, the remaining passage of each pair being designated by reference character 219. The blind passage or channel 219 is preferably transversely disposed with respect to the length of the shaft section 61, as more clearly shown in Figure 1 of the drawing.

Communication between the passages 218 and 219 of each pair of blind channels is preferably effected by a fitting, generally designated by reference character 220, and which is preferably exterior to the main body portion of each shaft section 61. For example, the fitting 220 may comprise an L-shaped joint or pipe-fitting 221 provided with the valve 222 and having a lower end 223 fitting into the outlet or transverse portion 224 of the channel or cored passage 218. The end 225 of the L-shaped fitting 221 is provided with the adjustable gland 226 and into it fits a sight glass or piece of glass tubing 227 which thus renders visible a portion at least of the flow of filtrate from each of the filtering elements 100. At 228 I have indicated a T-shaped fitting, the lower end of which, 229, fits into the upper portion of the channel 219. The transverse portion of the T-shaped fitting 228 is provided with the adjustable gland 230 and into it fits the remaining end of the sight glass or glass tubing 227. The sight glass 227 may be supported on an arm or bracket 222' carried by the outer surface of the shaft 61 which is provided within the bearings 55 with a steel bearing sleeve 60' for providing a proper bearing surface for the rotatable shaft section 61 and the rotatable parts of the machine carried thereby.

Filtrate coming from all of the operative filtering elements 100 discharges through the lower ends of the channels or passages 219 into the common outlet or manifold 231 which is formed as a hollow or cavity in the outer end of each shaft section 61. From the manifolds 231 the filtrate discharges into the stationary L-shaped pipes 232, communicating with the manifolds 231 at each end of the machine at the outer ends of the shaft sections 61. The discharge pipes 232 are stationary and are supported by suitable standards 233 and are provided at their lower discharge outlet ends with the swing pipes 234 by the manipulation of which liquor coming from the machine may be discharged either into the clear filtrate pipes leading to the clear filtrate tank or tanks, or into the cloudy filtrate pipes leading to the cloudy filtrate tank or tanks, in cases where, momentarily, as by reason of a defect in developing in one of the filtering elements 100, cloudy filtrate is discharged from the machine, until the valve 222 of the particular filtering element can be manipulated to shut off the discharge of filtrate from the defective filtering element and such element kept disconnected from the general filtrate discharge system either until the particular cycle of filtering operation is completed or until a new element can be substituted in place of the defective element, either before or after the particular cycle of filtering operation is completed. The clear filtrate pipes leading to the clear filtrate tank, which latter is not here deemed necessary to be shown, have been designated by reference character 235, while the cloudy filtrate pipes communicating with the cloudy filtrate tank, which latter is not here deemed necessary to be shown, have been designated by reference character 236.

The operation of the machine described above will be substantially clear from the foregoing description and may be briefly summarized as follows: Liquor to be filtered, such as sugar solutions carrying in suspension therein a filtering agent, such as an activated carbon, such as the "Suchar" referred to above, enters the machine, particularly the shell 10 comprised of the shell sections 11 and 12, by way of the filter feed inlet pipe 43, the valves 41, which are open, and the filter inlets 38, 39 and 40. As the machine fills up, the pressure of fluid within the same increases, thus all the more firmly seating the gasket or gaskets 25 provided with the depending hydraulic lip or lips 27, said gaskets having been preliminarily compressed by the adjustment of the hinges and swing bolts with which the machine is provided, which latter have been tightened by the operation of the nuts 34 on the threaded ends 35 of the shanks 31 of the swing bolts.

The valves 222, which separately and independently control the discharge of filtrate from each individual filtering element 100, are now operated so as to permit the discharge of filtrate from the interior of most of the filtering elements 100, except two or three filtering elements, which latter are preferably kept shut off during each cycle of filtering operation. There is thus one set, comprising most, of the filtering elements 100 which normally acts to discharge filtrate from the interior of such filtering elements by having the respective valves 222 opened. There is thus also another set of filtering elements, comprising a few of such filtering elements, which are preferably distributed equally throughout the entire group of filtering elements 100, which is normally preferably not used during the main cycle of the filtering operation, but is used to empty the machine at the end of such cycle, as will be subsequently described in greater detail.

The shaft sections 61 carrying the filter-element supporting frame 62 which in turn carries the filtering elements 100 and their associated fittings within the shell 10, are now put in rotation by any suitable means. For example, one of the shaft sections 61 may carry affixed thereto a worm gear 237 which meshes with a worm 238 carried by a drive shaft 239 which also carries a pulley 240, driven from any suitable source of power, not here deemed necessary to be shown. The rotation of the shaft sections 61 and the filter-element supporting frame 62 and the filtering elements 100 carried thereby at any suitable rate of speed, generally at a comparatively low rate of speed, such as two to ten, generally about three to five, revolutions per minute through the liquor to be filtered, which liquor now fills the shell 10 at a substantial pressure, depending upon the pressure with which the filtrate is forced into the shell 10, causes filtrate to pass into the interior of the operative filtering elements 100 in a uniform manner and with a correspondingly uniform deposit of the filtering agent, such as the "Suchar" or other activated vegetable carbon referred to above, upon the filtering surface, comprising the entire surface, of each operative filtering element 100.

Clear filtrate will thus be discharged from the interior of each filtering element 100 through its discharge fitting 167, through the communicating opening in the manifold 67, into and through the corresponding pipe 210, into the corresponding longitudinal channel or passage 218 in the shaft section 61, and thus into the external fitting 220 which is valve-controlled and which renders visible a portion at least of the flow of filtrate from each filtering element, thus enabling the discharge of filtrate from each filtering element to be individually controlled by the valve 222 in accordance with the operating conditions, particularly as revealed by the sight glass or glass tubing 227.

During the discharge of filtrate a constant circulation of liquor to be filtered containing in suspension the filtering agent, such as the "Suchar" or other activated vegetable carbon referred to, takes place from the interior of the shell 10, through the bleeds 36 controlled by the valves 37, into the reservoir of liquor to be filtered, and thence through the filter feed 43 back to the filtering machine. This manipulation of the liquor to be filtered containing in suspension therein the filtering agent referred to, greatly increases the efficiency of such agent and otherwise assists the efficiency of the filtering operation, particularly the rate of flow and purity of the filtrate and the most economical use of the filtering agent itself.

Should a defect develop in any one of the filtering elements 100, filtrate from such filtering element passing through the sight glass 227 will at once indicate which of the filtering elements is causing the trouble. For this purpose each of the filtering elements may be numbered with a number corresponding to a similar number on the respective fitting 220. Thus if it is found that a fitting 220 bearing the number "13" is passing cloudy filtrate through its sight glass 227, it is known that the filtering element "13" is defective. By the immediate operation of the appropriate valve 222 of the fitting 220 corresponding to the defective filtering element 100 bearing the number "13", such defective filtering element may be cut off from the general filtrate system until the particular cycle of filtering operation is completed, when the defective filtering element may be replaced with a perfect one. Moreover, the moment it is found the machine is passing cloudy filtrate, and even before the defective filtering element is cut off from the general system, the swing pipe 234 may be swung away from the position in which it is delivering clear filtrate through the clear filtrate pipe 235 into the clear filtrate tank, into a position where it will deliver cloudy filtrate through the cloudy filtrate pipe 236, into the cloudy filtrate tank.

At the conclusion of the cycle of the filtering operation now going on, the defective filtering element 100 may readily be replaced by a perfect filtering element. This operation is rendered very convenient due to the construction of the filtering elements and their mechanical relation with respect to the filter-element supporting frame 62. All that it is necessary to do to remove the defective filtering element is to remove the cap screw 206 at each end of the filtering element and to remove the corresponding short pipe sections 203. The filtering element may now be bodily removed from the filter-element supporting frame without disturbing any of the other perfectly functioning filtering elements and without any other manipulation of the machine as a whole.

It may here be stated that the fitting 167 at the end of the filtering element opposite the fitting 160 is likewise provided with a cap screw 205' and with a short pipe section 203'. The pipe section in this case, however, is not provided with any filtrate-discharging openings so that this end of the filtering element is closed against the discharge of filtrate.

When the cycle of the filtering operation just described has been completed, which is determined by the condition of the filtering agent, such as "Suchar" or other activated vegetable carbon, being exhausted, the machine must be cleaned before the next cycle of filtering operation can be commenced. Meanwhile, the bleeds 36 may have been shut off to prevent the further circulation of filter liquors carrying filtering agent in suspension therein when, for any reason, it is found desirable to shut off such circulation. This will generally be done where it is found that only a negligible quantity of filtering agent remains in suspension in the filtering liquor, which will be the case towards the end of the filtering operation when most of the filtering agent will have collected on the surfaces of the filtering elements.

The set of filtering elements 100 which has been used during the foregoing cycle of filtering operation is now shut off from communication with the general filtrate system and particularly with the filtrate discharge outlets, and the set of unused filtering elements described above is now placed in communication with the general filtrate system, particularly the filtrate discharge outlets. At the same time, the inlets for liquor to be filtered are, by the appropriate operation of the valves 41, brought out of communication with the filter feed 43. Air pressure is now applied to the machine in any desired manner to force the residue of filtering liquids within the machine rapidly through the very porous, unused filtering elements of the set of unused filtering elements referred to. In this manner the residue of filtering liquors remaining in the machine at the end of a cycle of filtering operation may be very readily discharged from the machine in the form of pure filtrate, without any delay and without the loss of any appreciable amount of the values contained in the residue of filter liquors.

There is now admitted to the machine, preferably through the inlets 38, 39 and 40, by opening the valves 41 controlling such inlets, a suitable amount of a cleansing liquor, such as water, preferably hot water. This may be done by bringing the inlet 43 of the machine into communication with any suitable supply of hot water or other cleansing liquor, which source of supply is not deemed necessary to be shown here. The level to which the hot water or other cleasing liquor is admitted to the machine may be varied within considerable limits, but is preferably kept at about one-third or one-fourth the depth of the shell 10. Live steam is now admitted through the nozzles 45 controlled by the valves 36. The live steam is admitted to the shell 10 so as to come directly into contact with the water or other cleansing liquor in the tank and thus serves to bring the water to a boiling temperature.

The rotation of the filtering elements carried by the filter-element supporting frame 62, which is in turn supported by the inner ends of the shaft sections 61, which rotation has been temporarily stopped after the completion of the cycle of the filtering operation described above, is now recommenced, but preferably at a higher rate of speed than is maintained during the normal filtering operation. Preferably, the rate of speed during the cleansing operation should be about ten to seventy-five, preferably about twenty-five, revolutions per minute.

I now flow cleansing liquor, preferably hot water, through the filtering elements in a direction reverse to the direction of the flow of filtrate through such filtering elements. This flow of cleansing liquor in the reverse direction takes place through each filtering element individually and is regulated and controlled by means of the valves 222 associated with each filtering element. The flow of hot water or other cleansing fluid in the reverse direction through the filtering elements individually operates to open up and expand each filtering element and by this action to dislodge most of the cake of deposit which has gathered on the surfaces of the filtering elements during the filtering operation. At the same time, the inlets 38, 39 and 40, which now act as outlets, are brought into communication, by opening the valves 41, with the swing pipe 44 to discharge the spent carbon, to return the same back to the system or to send the same to a revivifier where the same may be reactivated. During this operation, the valve controlling the filter feed is, of course, closed.

The filtering elements continue to be rotated and hot water or other cleansing liquor continues to be passed through the filtering elements in the reverse direction until the cleansing operation is completed. Due to the fact that each filtering element is provided with filtering surface over its entire area, including even its edges and peripheral portions, the flow of hot water or other cleansing liquor through the filtering elements in the reverse direction serves to clean the filtering elements even at their edges. This action, together with the presence of boiling water in the bottom of the shell 10, through which the filtering elements are being rotated, serves to render the cleaning operation very rapid and exceedingly efficient.

The advantages of the foregoing construction are numerous and of great practical importance. It will be noted that while possessing many remarkable features of construction and operation, giving the machine remarkable utility in use for the various purposes for which it is intended, the machine is, however, exceedingly simple in construction. Furthermore, the machine is very easy and convenient to assemble and exceedingly convenient and dependable in operation. By reason of its construction, the machine renders possible a very high rate of filtration. The machine also renders possible the continual determination and control of the discharge of filtrate from the various filtering elements and from the machine as a whole. The machine also enables the ready and convenient determination of which one of the series of filtering elements being used is defective, and the ready disconnection and replacement of such a defective filtering element. By its construction, also, the machine renders possible the speedy, convenient and thorough cleansing of the machine after a cycle of filtering operation has been completed. The machine possesses other important advantages and novel features of construction and operation which will be apparent to those skilled in the art to which the present invention relates.

What I claim as my invention is:

1. In a filtering machine, a plurality of sectional separable shell members having closed ends and a non-split gland mounted in each end of one of said shell sections, in combination with one or more bleeds communicating with the interior of said shell sections for withdrawing unfiltered liquor charged with a filtering agent.

2. In a filtering machine, separable cooperating shell sections and a non-split circular gland mounted on each end of one of said shell sections, in combination with one or more bleeds communicating with the interior of said shell sections for withdrawing unfiltered liquor charged with a filtering agent.

3. In a filtering machine, a plurality of sectional separable shell members having closed ends, one of said sections having a cross-sectional area greater, and the other of said sections having a cross-sectional area less, than a semi-circle, and a non-split gland mounted in each end of said section of greater cross-sectional area, in combination with a plurality of spaced, valve-controlled bleeds communicating with the interior of said shell sections adjacent the top of the upper one of said sections for circulating unfiltered liquor charged with suspended activated carbon.

4. In a filtering machine, separable cooperating shell sections, one of said shell sections being of greater cross-sectional area than the other, and a non-split circular gland mounted on each end of said section of greater cross-sectional area, in combination with a plurality of spaced, valve-controlled bleeds communicating with the interior of said shell sections adjacent the top of the upper one of said sections for circulating unfiltered liquor charged with suspended activated carbon.

5. In a filtering machine, separable cooperating shell sections and a non-split circular gland mounted on each end of one of said shell sections, in combination with one or more bleeds communicating with the interior of said shell sections for withdrawing unfiltered liquor charged with a filtering agent and a plurality of spaced inlets for unfiltered liquor also communicating with the interior of said shell sections.

6. In a filtering machine, a plurality of sectional separable shell members having closed ends and a non-split gland mounted in each end of one of said shell sections, in combination with one or more bleeds communicating with the interior of said shell sections for withdrawing unfiltered liquor charged with a filtering agent and a plurality of spaced inlets for unfiltered liquor also communicating with the interior of said shell sections.

7. In a filtering machine, separable cooperating shell sections, one of said shell sections being of greater cross-sectional area than the other, and a non-split circular gland mounted on each end of said section of greater cross-sectional area, in combination with a plurality of spaced, valve-controlled bleeds communicating with the interior of said shell sections adjacent the top of the upper one of said sections for circulating unfiltered liquor charged with suspended activated carbon and a plurality of spaced, valve-controlled inlets for unfiltered liquor also communicating with the interior of said shell sections adjacent the bottom of the lower one of said sections.

8. In a filtering machine, a plurality of sectional separable cylindrical shell members having closed ends, one of said sections having a cross-sectional area greater, and the other of said sections having a cross-sectional area less, than a semi-circle, and a non-split gland mounted in each end of said section of greater cross-sectional area, in combination with a plurality of spaced, valve-controlled bleeds communicating with the interior of said shell sections adjacent the top of the upper one of said sections for circulating unfiltered liquor charged with suspended activated carbon and a plurality of spaced, valve-controlled inlets for unfiltered liquor also communicating with the interior of said shell sections adjacent the bottom of the lower one of said sections.

9. In a rotary filtering machine, an outer shell, a non-split circular gland mounted on each end of said shell, a plurality of relatively short shaft sections mounted for rotation in the ends of the shell and passing through said glands, a plurality of filtering elements mounted on said shaft sections, each of said shaft sections being cored to provide a plurality of independent passages for the discharge of filtrate, and a discharge manifold communicating between each of said filtering elements and each of said independent passages.

10. In a rotary filtering machine, an outer shell, a plurality of relatively short shaft sections mounted for rotation in the ends of the shell, each of said shaft sections being cored to provide a plurality of independent passages for the discharge of filtrate, a plurality of filtering elements mounted on said shaft sections, and a support manifold communicating between each filtering element and each independent passage.

11. In a rotary filtering machine, an outer shell, a plurality of relatively short shaft sections mounted for rotation in the ends of the shell, each of said shaft sections being provided with pairs of blind channels in the two ends of each shaft section, a plurality of filtering elements mounted on said shaft sections and a support manifold communicating between each filtering element and each pair of said blind channels.

12. In a rotary filtering machine, an outer shell, a non-split circular gland mounted on each end of said shell, a plurality of relatively short shaft sections mounted for rotation in the ends of the shell, and passing through said glands, each of said shaft sections being provided with pairs of blind channels in the two ends of each shaft section, a plurality of filtering elements mounted on said shaft sections and a support manfold communicating between each filtering element and each pair of said blind channels.

13. In a rotary filtering machine, an outer shell, a non-split circular gland mounted on each end of said shell, a plurality of relatively short shaft sections mounted for rotation in the ends of the shell and passing through said glands, each of said shaft sections being provided with pairs of blind channels in the two ends of each shaft section, connection means for connecting the channels of each pair thus to provide a plurality of independent passages for the discharge of filtrate, a plurality of filtering elements mounted on said shaft sections, and a support manifold communicating between each filtering element and each independent passage.

14. In a rotary filtering machine, an outer shell, a plurality of relatively short shaft sections mounted for rotation in the ends of the shell, each of said shaft sections being provided with pairs of blind channels in the two ends of each shaft section, connection means for connecting the channels of each pair thus to provide a plurality of independent passages for the discharge of filtrate, a plurality of filtering elements mounted on said shaft sections, and a support manifold communicating between each filtering element and each independent passage.

15. In a rotary filtering machine, an outer shell, a plurality of relatively short shaft sections mounted for rotation in the ends of the shell, each of said shaft sections being provided with pairs of blind channels in the two ends of each shaft section, connection means exterior to said shaft sections for connecting the channels of each pair thus to provide a plurality of independent passages for the discharge of filtrate, a plurality of filtering elements mounted on said shaft sections, and a support manifold communicating between each filtering element and each independent passage.

16. In a rotary filtering machine, an outer shell, a non-split circular gland mounted on each end of said shell, a plurality of relatively short shaft sections mounted for rotation in the ends of the shell and passing through said glands, each of said shaft sections being provided with pairs of blind channels in the two ends of each shaft section, connection means exterior to said shaft sections for connecting the channels of each pair thus to provide a plurality of independent passages for the discharge of filtrate, a plurality of filtering elements mounted on said shaft sections, and a support manifold communicating between each filtering element and each independent passage.

17. In a rotary filtering machine, an outer shell, and a plurality of relatively short shaft sections mounted for rotation in the ends of the shell, each of said shaft sections being provided with pairs of blind channels in the two ends of each shaft section, and connection means for connecting the channels of each pair thus to provide a plurality of independent passages for the discharge of filtrate, a portion, at least, of each of which independent passages is so constructed as to render visible the condition of the filtrate passing therethrough.

18. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, and connection means for connecting the channels of each pair thus to provide a plurality of independent passages for the discharge of filtrate, a portion, at least, of each of which independent passages is so constructed as to render visible the condition of the filtrate passing therethrough.

19. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, and connection means exterior to said shaft sections for connecting the channels of each pair thus to provide a plurality of independent passages for the discharge of filtrate, a portion, at least, of each of which independent passages is so constructed as to render visible the condition of the filtrate passing therethrough.

20. In a rotary filtering machine, an outer shell, and a plurality of relatively short shaft sections mounted for rotation in the ends of the shell, each of said shaft sections being provided with pairs of blind channels in the two ends of each shaft section, and connection means exterior to said shaft sections for connecting the channels of each pair thus to provide a plurality of independent passages for the discharge of filtrate, a portion, at least, of each of which independent passages is so constructed as to render visible the condition of the filtrate passing therethrough.

21. In a rotary filtering machine, an outer shell, a shaft passing into said shell, and a filter-element supporting frame carried for rotation by said shaft and comprising a plurality of oppositely disposed channel beams, a plurality of cooperating angle irons and a plurality of associated manifolds.

22. In a rotary filtering machine, an outer shell, a plurality of shaft sections passing into said shell, and a filter-element supporting frame carried for rotation by said shaft sections and comprising a plurality of oppositely disposed channel beams, a plurality of cooperating angle irons and a plurality of associated manifolds.

23. In a rotary filtering machine, an outer shell, a shaft passing into said shell, and a filter-element supporting frame carried for rotation by said shaft and comprising a plurality of oppositely disposed channel beams attached to said shaft sections, a plurality of angle irons attached to said channel beams and a plurality of manifolds attached to said angle irons.

24. In a rotary filtering machine, an outer shell, a shaft passing into said shell, and a filter-element supporting frame carried for rotation by said shaft, in combination with a plurality of filtering elements, a plurality of fitting members associated with each of said filtering elements for carrying the same and in turn carried by said filter-element supporting frame, at least one of said fitting members communicating with the interior of its respective filtering element, and a separate filtrate discharging member communicating by way of said last-mentioned fitting member with said last-mentioned filtering element.

25. In a rotary filtering machine, an outer shell, a plurality of shaft sections passing into said shell, and a filter-element supporting frame carried for rotation by said shaft sections, in combination with a plurality of filtering elements, a plurality of fitting members associated with each of said filtering elements for carrying the same and in turn carried by said filter-element supporting frame, at least one of said fitting members communicating with the interior of its respective filtering element, and a separate filtrate discharging member communicating by way of said last-mentioned fitting member with said last-mentioned filtering element.

26. In a rotary filtering machine, an outer shell, a shaft passing into said shell, and a substantially rectangular filter-element supporting frame carried for rotation by said shaft, in combination with a plurality of filtering elements, a plurality of fitting members associated with each of said filtering elements for carrying the same and in turn carried by said filter-element supporting frame, at least one of said fitting members communicating with the interior of its respective filtering element, and a separate filtrate discharging member communicating by way of said last-mentioned fitting member with said last-mentioned filtering element.

27. In a rotary filtering machine, an outer shell, a shaft passing into said shell, and a substantially rectangular filter-element supporting frame carried for rotation by said shaft, in combination with a plurality of filtering elements, a plurality of fitting members associated with each of said filtering elements for carrying the same and in turn carried by said filter-element supporting frame, at least one of said fitting members communicating with the interior of its respective filtering element and an independently regulatable filtrate-discharging member communicating by way of said last-mentioned fitting member with said last-mentioned filtering element.

28. In a rotary filtering machine, an outer shell, a plurality of shaft sections passing into said shell, and a substantially rectangular filter-element supporting frame carried for rotation by said shaft sections, in combination with a plurality of filtering elements, a plurality of fitting members associated with each of said filtering elements for carrying the same and in turn carried by said filter-element supporting frame, at least one of said fitting members communicating with the interior of its respective filtering element, and an independently regulatable filtrate-discharging member communicating by way of said last-mentioned fitting member with said last-mentioned filtering element.

29. In a rotary filtering machine, an outer shell, a shaft passing into said shell, and a filter-element supporting frame carried for rotation by said shaft, in combination with a plurality of filtering elements, a plurality of fitting members associated with each of said filtering elements for carrying the same and in turn carried by said filter-element supporting frame, at least one of said fitting members communicating with the interior of its respective filtering element, and an independently regulatable filtrate-discharging member communicating by way of said last-mentioned fitting member with said last-mentioned filtering element.

30. In a rotary filtering machine, an outer shell, a non-split circular gland mounted on each end of said shell, and a plurality of relatively short shaft sections mounted for rotation in the ends of the shell and passing through said glands, each of said shaft sections being cored to provide a plurality of independent passages for the discharge of filtrate, in combination with a filtering-element supporting frame carried by said shaft sections, a plurality of filtering elements carried by said frame, and independently regulatable means for connecting the interior of each of said filtering elements with one of said independent passages.

31. In a rotary filtering machine, an outer shell, and a plurality or relatively short shaft sections mounted for rotation in the ends of the shell, each of said shaft sections being cored to provide a plurality of independent passages for the discharge of filtrate, in combination with a filtering-element supporting frame carried by said shaft sections, and independently regulatable means for connecting the interior of each of said filtering elements with one of said independent passages.

32. In a rotary filtering machine, an outer shell, and a plurality of relatively short shaft sections mounted for rotation in the ends of the shell, each of said shaft sections being provided with pairs of blind channels in the two ends of each shaft section, in combination with a filtering-element supporting frame carried by said shaft sections, a plurality of filtering elements carried by said frame, and means for connecting the interior of each of said filtering elements with a pair of said blind channels to provide for the discharge of filtrate therefrom.

33. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, in combination with a filtering-element supporting frame carried by said shaft sections, a plurality of filtering elements carried by said frame, and independently regulatable means for connecting the interior of each of said filtering elements with a pair of said blind channels to provide for the discharge of filtrate therefrom.

34. In a rotary filtering machine, an outer shell, and a plurality of relatively short shaft sections mounted for rotation in the ends of the shell, each of said shaft sections being provided with pairs of blind channels in the two ends of each shaft section, and connection means for connecting the channels of each pair thus to provide a plurality of independent passages for the discharge of filtrate, a portion, at least, of each of which independent passages is so constructed as to render visible the condition of the filtrate passing therethrough, in combination with a filtering-element supporting frame carried by said shaft sections, a plurality of filtering elements carried by said frame, and means for connecting the interior of each of said filtering elements with one of the channels of a pair of such channels.

35. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, and connection means exterior to said shaft sections for connecting the channels of each pair thus to provide a plurality of independent passages for the discharge of filtrate, in combination with a filtering-element supporting frame carried by said shaft sections, a plurality of filtering elements carried by said frame, and means for connecting the interior of each of said filtering elements with one of the channels of a pair of such channels.

36. In a rotary filtering machine, an outer shell, and a plurality of relatively short shaft sections mounted for rotation in the ends of the shell, each of said shaft sections being provided with pairs of blind channels in the two ends of each shaft section, and connection means exterior to said shaft sections for connecting the channels of each pair thus to provide a plurality of independent passages for the discharge of filtrate, in combination with a filtering-element supporting frame carried by said shaft sections, a plurality of filtering elements carried by said frame, and means for connecting the interior of each of said filtering elements with one of the channels of a pair of such channels.

37. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, and connection means exterior to said shaft sections for connecting the channels of each pair thus to provide a plurality of independent passages for the discharge of filtrate, a portion, at least, of each of which independent passages is so constructed as to render visible the condition of the filtrate passing therethrough, in combination with a filtering-element supporting frame carried by said shaft sections, a plurality of filtering elements carried by said frame, and means for connecting the interior of each of said filtering elements with one of the channels of a pair of such channels.

38. In a rotary filtering machine, an outer shell, and a plurality of relatively short shaft sections mounted for rotation in the ends of the shell, each of said shaft sections being provided with pairs of blind channels in the two ends of each shaft section, and connection means for connecting the channels of each pair thus to provide a plurality of independent passages for the discharge of filtrate, in combination with a filtering-element supporting frame carried by said shaft sections, a plurality of filtering elements carried by said frame, and means for connecting the interior of each of said filtering elements with one of the channels of a pair of such channels.

39. In a rotary filtering machine, an outer shell, and a plurality of relatively short shaft sections mounted for rotation in the ends of the shell, each of said shaft sections being provided with pairs of blind channels in the two ends of each shaft section, and connection means exterior to said shaft sections for connecting the channels of each pair thus to provide a plurality of independent passages for the discharge of filtrate, a portion, at least, of each of which independent passages is so constructed as to render visible the condition of the filtrate passing therethrough, in combination with a filtering-element supporting frame carried by said shaft sections, a plurality of filtering elements carried by said frame, and means for connecting the interior of each of said filtering elements with one of the channels of a pair of such channels.

40. In a rotary filtering machine, an outer shell, and a plurality of relatively short shaft sections mounted for rotation in the ends of the shell, each of said shaft sections being provided with pairs of blind channels in the two ends of each shaft section, and connection means exterior to said shaft sections for connecting the channels of each pair thus to provide a plurality of independent passages for the discharge of filtrate, a portion, at least, of each of which independent passages is so constructed as to render visible the condition of the filtrate passing therethrough, in combination with a filtering-element supporting frame carried by said shaft sections, a plurality of filtering elements carried by said frame, and independently regulatable means for connecting the interior of each of said filtering elements with one of the channels of a pair of such channels.

41. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, and connection means exterior to said shaft sections for connecting the channels of each pair thus to provide a plurality of independent passages for the discharge of filtrate, a portion, at least, of each of which independent passages is so constructed as to render visible the condition of the filtrate passing therethrough, in combination with a filtering-element supporting frame carried by said shaft sections, a plurality of filtering elements carried by said frame, and independently regulatable means for connecting the interior of each of said filtering elements with one of the channels of a pair of such channels.

42. In a rotary filtering machine, an outer shell, and a plurality of relatively short shaft sections mounted for rotation in the ends of the shell, each of said shaft sections being provided with pairs of blind channels in the two ends of each shaft section, and connection means for connecting the channels of each pair thus to provide a plurality of independent passages for the discharge of filtrate, a portion, at least, of each of which independent passages is so constructed as to render visible the condition of the filtrate passing therethrough, in combination with a filtering-element supporting frame carried by said shaft sections, a plurality of filtering elements carried by said frame, and independently regulatable means for connecting the interior of each of said filtering elements with one of the channels of a pair of such channels.

43. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section, and connection means exterior to said shaft sections for connecting the channels of each pair thus to provide a plurality of independent passages for the discharge of filtrate, in combination with a filtering-element supporting frame carried by said shaft sections, a plurality of filtering elements carried by said frame, and independently regulatable means for connecting the interior of each of said filtering elements with one of the channels of a pair of such channels.

44. In a rotary filtering machine, an outer shell, and a plurality of relatively short shaft sections mounted for rotation in the ends of the shell, each of said shaft sections being provided with pairs of blind channels in the two ends of each shaft section, and connection means for connecting the channels of each pair thus to provide a plurality of independent passages for the discharge of filtrate, in combination with a filtering-element supporting frame carried by said shaft sections, a plurality of filtering elements carried by said frame, and independently regulatable means for connecting the interior of each of said filtering elements with one of the channels of a pair of such channels.

45. In a rotary filtering machine, an outer shell, a non-split circular gland mounted on each end of said shell, and a plurality of relatively short shaft sections mounted for rotation in the ends of the shell and passing through said glands, each of said shaft sections being provided with pairs of blind channels in the two ends of each shaft section and connection means for connecting the channels of each pair thus to provide a plurality of independent passages for the discharge of filtrate, in combination with a filtering-element supporting frame carried by said shaft sections, a plurality of filtering elements carried by said frame, and independently regulatable means for connecting the interior of each of said filtering elements with one of the channels of a pair of such channels.

In testimony whereof, I have signed my name to this specification this 23rd day of August, 1923.

JOHN J. NAUGLE.